(12) United States Patent
Hill

(10) Patent No.: US 7,434,570 B2
(45) Date of Patent: Oct. 14, 2008

(54) SNAP-ACTION VALVE FOR EXHAUST SYSTEM

(75) Inventor: William E. Hill, Ann Arbor, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

(21) Appl. No.: 11/687,151

(22) Filed: Mar. 16, 2007

(65) Prior Publication Data
US 2008/0224083 A1    Sep. 18, 2008

(51) Int. Cl.
*F02M 25/10* (2006.01)
*F01N 7/08* (2006.01)

(52) U.S. Cl. .................. 123/568.18; 181/227

(58) Field of Classification Search ............ 123/568.18, 123/396, 337; 181/237, 278, 228, 227; 137/527.6, 137/527, 535; 60/324
See application file for complete search history.

(56) References Cited

U.S. PATENT DOCUMENTS

| | | | |
|---|---|---|---|
| 1,860,892 A | | 5/1932 | Gray |
| 2,072,372 A | | 3/1937 | Kingsley |
| 2,556,277 A | * | 6/1951 | Hill et al. ................. 244/57 |
| 3,703,937 A | * | 11/1972 | Tenney ..................... 181/226 |
| 4,356,801 A | * | 11/1982 | Graham .................... 123/337 |
| 4,565,176 A | | 1/1986 | Alf et al. |
| 4,805,571 A | * | 2/1989 | Humphrey ................. 123/316 |
| 4,903,486 A | * | 2/1990 | Finkle ....................... 60/324 |
| 5,355,673 A | | 10/1994 | Sterling et al. |
| 5,392,812 A | | 2/1995 | Herron |
| 5,692,374 A | | 12/1997 | Seki et al. |
| 5,723,829 A | | 3/1998 | Inomata et al. |
| 5,739,483 A | | 4/1998 | Yashiro et al. |
| 5,744,762 A | | 4/1998 | Seki et al. |
| 5,749,335 A | * | 5/1998 | Flanery et al. .............. 123/337 |
| 5,801,343 A | | 9/1998 | Suzuki et al. |
| 5,821,474 A | | 10/1998 | Olszok et al. |
| 5,971,098 A | | 10/1999 | Suzuki et al. |
| 6,189,650 B1 | | 2/2001 | Inuzuka et al. |
| 6,499,562 B1 | | 12/2002 | Elfinger et al. |
| 6,527,006 B2 | | 3/2003 | Jackson |
| 6,553,963 B1 | * | 4/2003 | Noble ....................... 123/337 |
| 6,564,902 B1 | * | 5/2003 | Saberi ....................... 181/237 |
| 6,581,721 B2 | | 6/2003 | Nagai et al. |
| 6,604,516 B1 | | 8/2003 | Krimmer et al. |
| 6,640,927 B1 | * | 11/2003 | Turner ....................... 181/252 |
| 6,732,511 B2 | | 5/2004 | Unbehaun et al. |
| 2006/0272322 A1 | | 12/2006 | Abram et al. |

* cited by examiner

*Primary Examiner*—Mahmoud Gimie
(74) *Attorney, Agent, or Firm*—Harness, Dickey & Pierce, P.L.C.

(57) ABSTRACT

A passive, exhaust pressure actuated valve assembly for placement inside a tubular exhaust conduit is pivotally mounted to an off-center axle for rotation between fully closed and fully opened positions. A bias element forces the valve flap toward the fully closed position. The valve flap is shaped in a manner enabling use of the interior surface of the exhaust conduit to define stops at the full closed and full opened positions. The valve flap shape, in conjunction with the bias element arrangement, enables the flap to lie substantially parallel to a longitudinal axis of the conduit in the fully opened position, which provides for minimum back pressure in the conduit.

4 Claims, 3 Drawing Sheets

SNAP-ACTION VALVE FOR EXHAUST SYSTEM

BACKGROUND

Field

The invention generally relates to valve arrangements for vehicle exhaust systems. More specifically, the present teachings pertain to passive flapper valves for exhaust conduits.

Many exhaust systems have attempted to use both active and passive valve assemblies to alter the characteristics of exhaust flow through a conduit as the exhaust pressure increases due to increasing engine speed. Active valves carry the increased expense of requiring a specific actuating element, such as a solenoid. Passive valves utilize the pressure of the exhaust stream in the conduit with which the valve is associated.

Traditionally, even passive valves at their lower expense give rise to problems of unwanted back pressure when the valve is open. There is seen to be a need in the art for a passive valve arrangement which may be utilized totally inside a conduit, which is relatively inexpensive, and is capable of assuming a fully open position which minimizes unwanted back pressure.

SUMMARY

Accordingly, an exhaust pressure actuated valve assembly for placement inside a tubular exhaust conduit includes a valve flap having first and second arcuate edges substantially conforming to curved portions of the exhaust conduit, and first and second linear edges extending between the first and second arcuate edges and providing clearance between the valve flap and an inner surface of the conduit. An axle adapted to pivotally couple the valve flap to the exhaust conduit about a longitudinal axis of the axle is coupled to the valve flap between the first and second arcuate edges such that unequal surface areas of the valve flap lie on either side of the axle. The axle further includes a protrusion at one end thereof adapted to be positioned exteriorly of the exhaust conduit. A bias element is adapted to be coupled between the exhaust conduit and the axle protrusion and is operative to bias the valve flap toward a closed position wherein the first and second arcuate edges of the valve flap contact curved portions of the exhaust conduit. Exhaust pressure may be of a magnitude overcoming a bias force of the bias element to force the valve flap to a fully opened position within the conduit wherein the first and second linear edges of the valve flap contact an inner surface of the valve conduit and are substantially parallel to the longitudinal axis of the conduit.

In a further aspect of the disclosed teachings, a muffler for an internal combustion engine exhaust system includes a housing having an outer shell, input and output headers closing opposite ends of the shell and a partition inside the housing dividing it into first and second chambers. The partition has at least one aperture therethrough providing for fluid communication between the first and second chambers. A through pipe extends through the input and output headers and the partition and has a first plurality of perforations enabling fluid communication between the through pipe and the first chamber and a second plurality of perforations enabling fluid communication between the through pipe and the second chamber. A valve assembly having a valve flap is positioned inside the through pipe between the first and second pluralities of through pipe perforations. The valve flap rotates about an axle pivotally coupled to the pipe between a fully closed position wherein a first peripheral portion of the valve flap is in contact with an inner surface of the through pipe and a fully opened position wherein a plane of the valve flap is substantially parallel to a longitudinal axis of the through pipe and a second peripheral portion of the valve flap is in contact with an inner surface of the through pipe.

In still a further aspect of the disclosed teachings, a fluid flow pressure actuated valve assembly for placement inside a tubular conduit includes a valve flap having a first peripheral portion adapted to be in contact with an inner surface of the conduit when the flap is in a full closed position and a second peripheral portion in contact with the inner surface of the conduit in a full open position. An axle is adapted to pivotally couple the valve flap to the conduit about a londitudinal axis of the axle, the axle coupled to the valve flap asymmetrically with respect to a surface area of the valve flap, the axle including a protrusion adapted to be positioned outside the conduit. A bias element is adapted to be coupled between the conduit and the protrusion and is operative to urge the valve flap toward the full closed position.

BRIEF DESCRIPTION OF THE DRAWING

The objects and features of the disclosed teaching will become apparent from a reading of the detailed description, taken in conjunction with the drawing, in which.

DETAILED DESCRIPTION

Figure 1A:
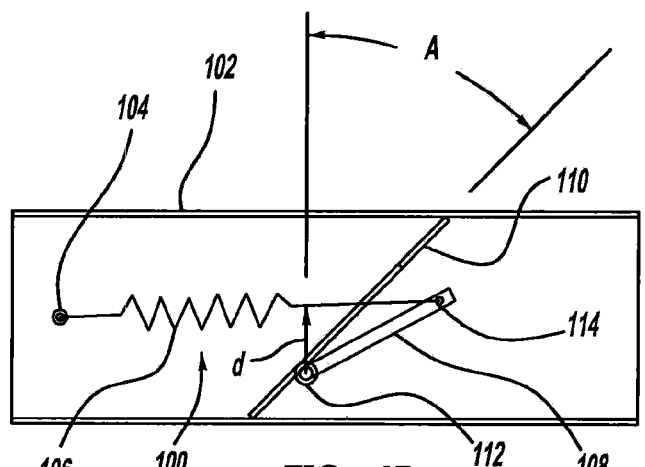
FIGS. 1A, 1B are respective side and end views of a valve controlling fluid flow through a conduit, the valve being in a closed position and arranged in accordance with the disclosed teachings.

With reference to FIGS. 1A-4B, side and end views of a valve assembly with a valve flap in various operative positions is shown in side and end views of the conduit in which the valve assembly is positioned. Identical elements among these Figures carry the same last two designation numerals.

An exhaust conduit 102 contains a snap-action valve 100 which includes a spring anchor 104, a valve spring 106, an external lever arm 108, a valve flap 110, a valve support shaft or axle 112 and a spring attachment arm 114 protruding from axle 112.

Valve flap 110 has first and second arcuate edges substantially conforming to an interior arcuate surface of conduit 102. Flapper 110 additionally has linear side edges 116 and 118 which provide clearance 120, 122 between flapper 110 and an interior surface of conduit 102 when the flap is in the closed position shown in FIGS. 1A and 1B. Bias element or spring 106 extends between an anchor point 104 on conduit 102 and attachment point 114 of external lever arm 108. Spring 106 biases flapper 110 toward the closed positioned shown in FIG. 1A. When in the fully closed position, flap 110 resides at an angle other than 90° to a plane extending normal to the longitudinal axis of conduit 102. The angle of the flap with respect to a cross-sectional normal plane of conduit 102 is designated A.

Figure 4A:
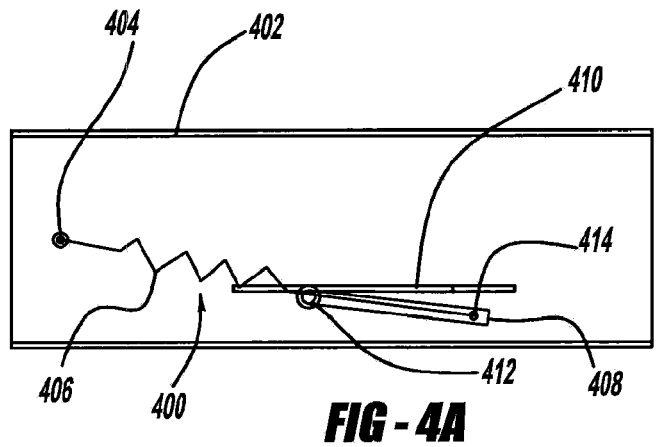
FIGS. 4A, 4B are respective side and end views of the valve of FIGS. 1A, 1B in a fully open position.
Figure 4B:
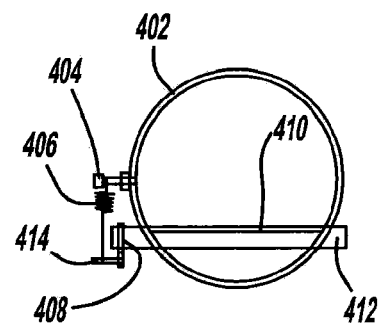

In operation, exhaust pressure is incident on flap 110 from the left as viewed in FIGS. 1A-4B. When the exhaust pressure is sufficient to overcome the bias force of spring 106, the flap 110 will start to rotate about axle 112. The torque on valve flap 110 is determined by the bias spring force multiplied by the distance d which is the distance d between the axis of the spring and axle 112. The spring force increases as the valve flap opens and the spring 106 stretches. However, d gets shorter as the valve continues to open resulting in the torque approaching zero as the longitudinal axis of the spring approaches an "over-center" position—i.e., as it approaches intersection with a longitudinal axis of the axle 112. This nearly over-center positioning of the valve flap as shown at 410 in FIG. 4A and FIG. 4B results in a substantially horizontal position of the flap when in the fully open position. This positioning, in turn, minimizes back pressure in the conduit when the valve is in the fully open position. Additionally, it is to be noted that the conduit itself supplies the stop mechanism for the valve flap in both its fully closed and fully opened positions. In the fully closed position, the arcuate edges of flap 114 contact the interior surface of conduit 102 to define that position. Conversely, when in the fully opened position, as shown in FIGS. 4A and 4B, flap 410 utilizes its lateral linear edges (116 and 118 of FIG. 1B) to come into contact with the inner surface of conduit 402 to thereby provide a stop position for the fully opened position of flap 410.

Rotating the valve flap such that the spring approaches the over-center condition also results in an easier maintenance of the valve in the fully opened position.

Figure 5A:
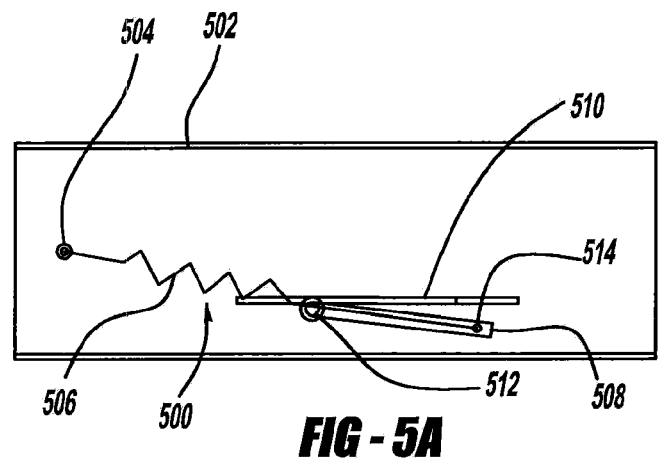
FIGS. 5A, 5B are respective side and end views of a first valve axle arrangement in accordance with the present teachings.
Figure 5B:
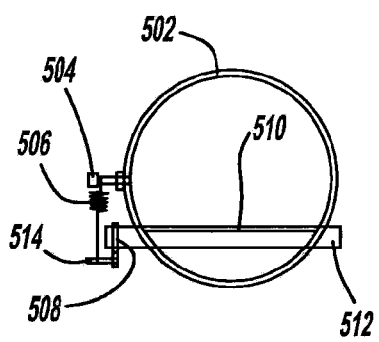

FIGS. 5A and 5B show a first axle arrangement suitable for use with the valve assembly disclosed herein. Valve flap 510 rotates within conduit 502 about axle 512 which is placed asymmetrically with respect to the plane of flap 510. A bias spring 506 extends between anchor point 504 and an attachment point 514 on lever arm 508. As seen from FIG. 5B, axle 512 which is journaled to conduit 502 via appropriate apertures, extends only so far at its leftmost end as shown in FIG. 5B so as to provide clearance between the axle 512 and spring 506. With this clearance, the spring goes to near over-center and holds that position until the exhaust flow pressure is reduced significantly. At that point, the valve flap snaps to the closed position. Lever arm 508 protrudes from axle 512 either as a separately attachable element or as an integral protrusion of axle 512.

Figure 6A:
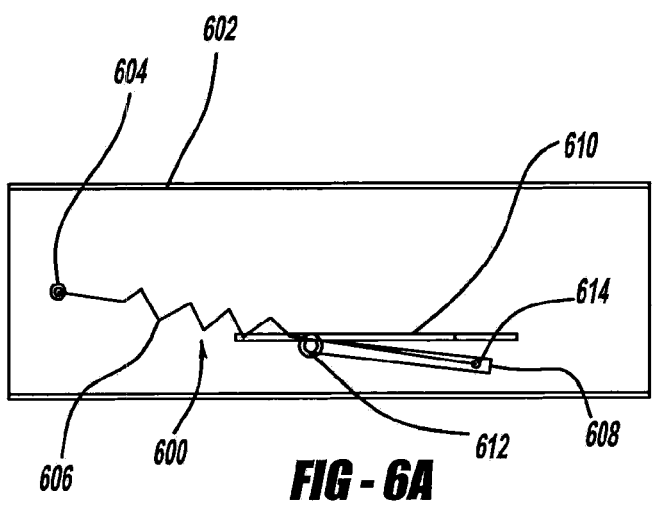
FIGS. 6A, 6B are respective side and end views of a second valve axle arrangement in accordance with the present teachings.
Figure 6B:
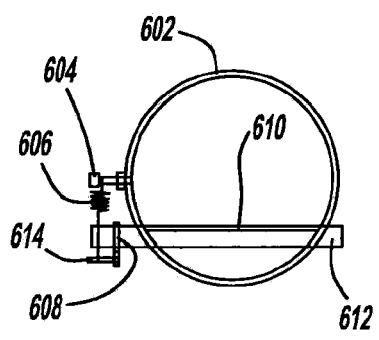

FIGS. 6A and 6B depict an alternative axle arrangement for use with the valve assembly disclosed. In this arrangement axle 612 extends outwardly of the conduit for a distance sufficient that it intersects the ultimate location of spring 606 when in its fully extended position. Hence, in this arrangement, spring 606 will contact axle 612 and wrap around it when the fully opened position is achieved. With this arrangement, since spring 606 wraps around axle 612, the spring will pull the flap 610 to the closed position as soon as the exhaust flow pressure is reduced to a level unable to overcome the spring force.

Figure 1B:
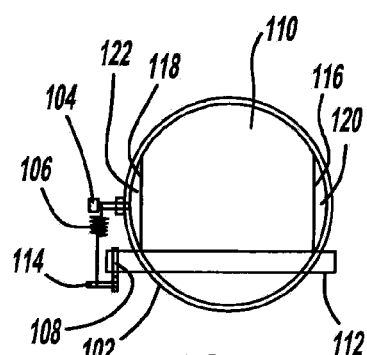
Figure 2A:
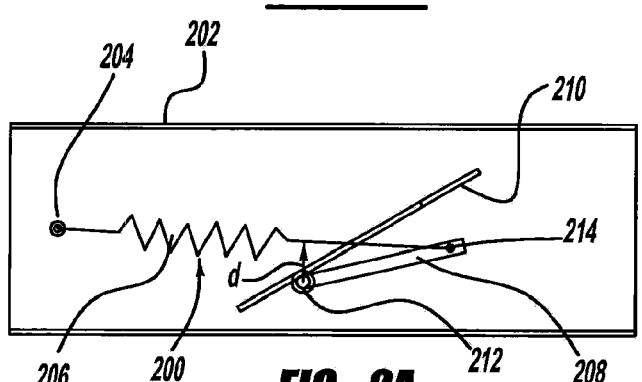
FIGS. 2A, 2B are respective side and end views of the valve of FIGS. 1A, 1B in a 15° open position.
Figure 2B:
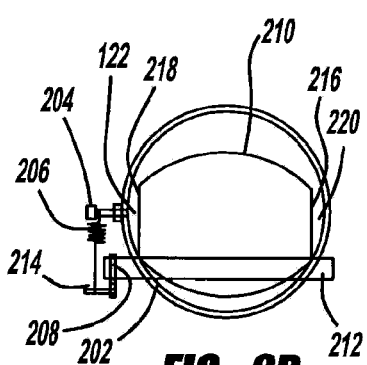
Figure 3A:
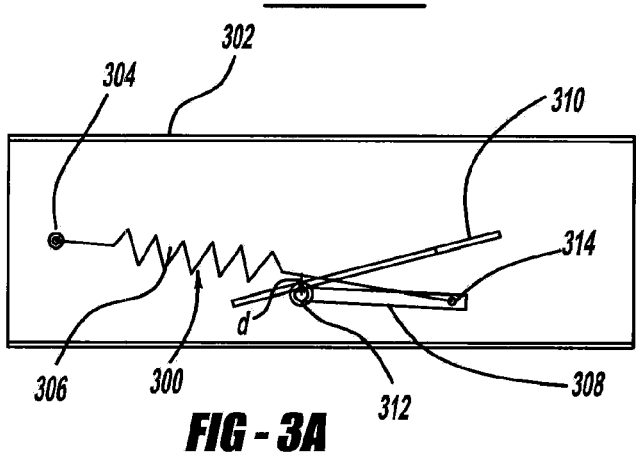
FIGS. 3A, 3B are respective side and end views of the valve of FIGS. 1A, 1B in a 30° open position.
Figure 3B:
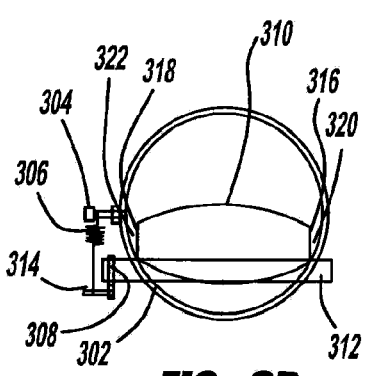
Figure 7:
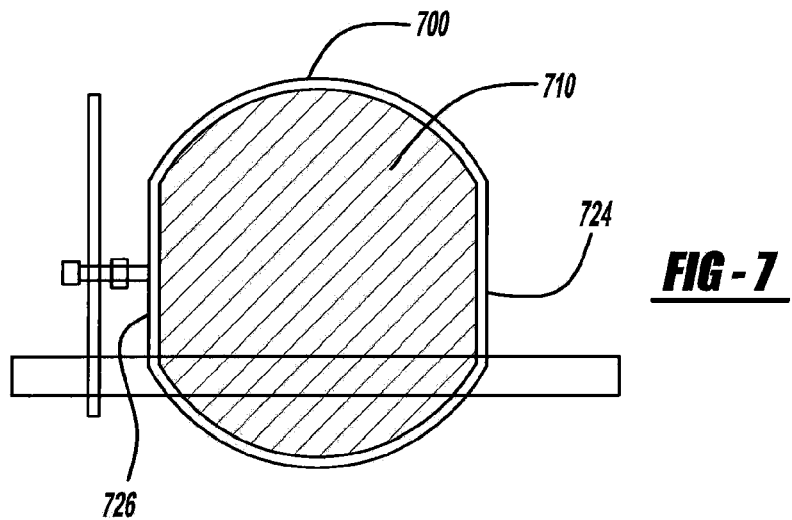
FIG. 7 is an end view of the valve of FIGS. 1A and 1B with the pipe contacting the valve flap altered to achieve substantially full blockage of the pipe when the valve is placed in the fully closed position.

FIG. 7 depicts one approach to achieving nearly full closure of the exhaust conduit by the disclosed valve assembly when the valve flap is put in its fully closed position. As seen from FIG. 7, clearance areas such as 120 and 122 of FIG. 1B are substantially eliminated by flattening sides of conduit 700 such Section 724 and section 726 are flattened areas of conduit 700 to more nearly parallel the linear first and second edges of valve flap 710. Of course it will be apparent to those skilled in the art that some clearance between the linear edges of valve flap 710 and conduit walls 724 and 726 must be present to prevent jamming of the valve flap upon rotating.

Figure 8:
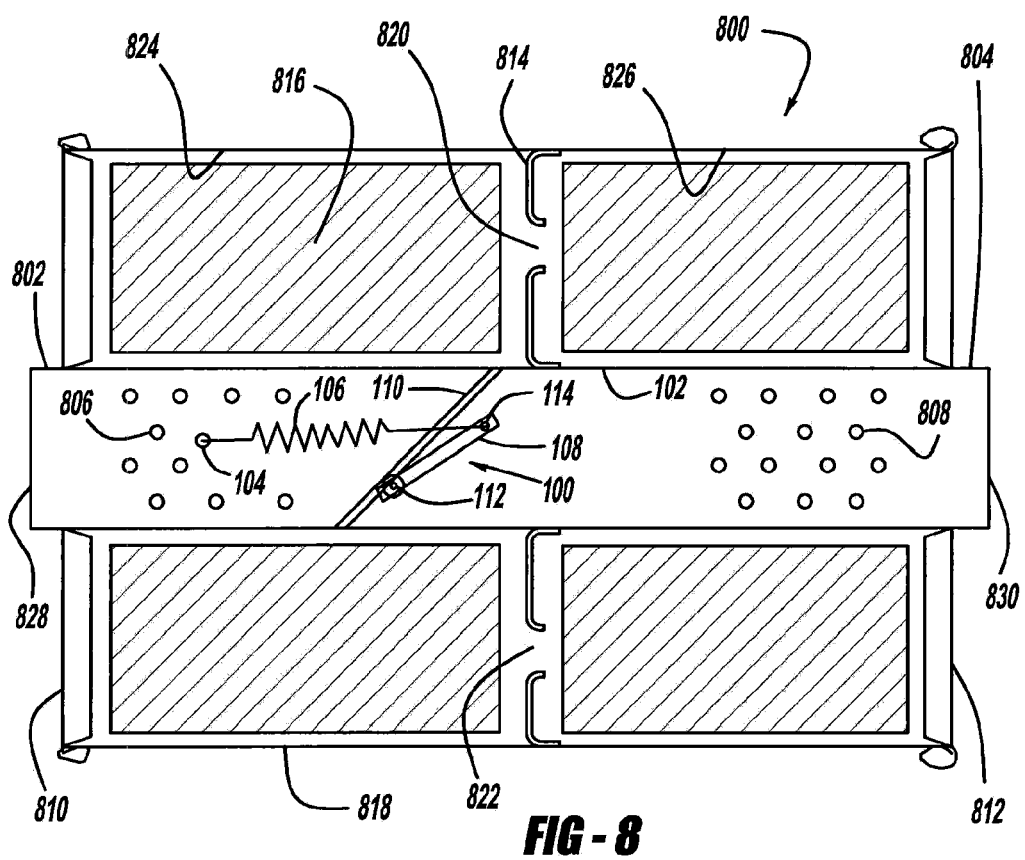
FIG. 8 is a side cross-sectional view of an exhaust muffler arranged with the valve of FIGS. 1A, 1B in accordance with the present teachings.

An exemplary application of the disclosed valve assembly is for an automotive exhaust system muffler, such as that shown in FIG. 8.

Muffler 800 has a housing comprised of a substantially cylindrical outer shell 818 closed at input and output ends by an input header 810 and an output header 812. A partition 814 is attached to outer shell 818 at a position to define muffler chambers 824 and 826 on either side thereof. Partition 814 additionally includes at least one aperture 820, 822 enabling fluid communication between the chambers 824 and 826 inside muffler 800. Optionally, sound absorbing material 816 may be placed in one or both interior muffler chambers.

Extending through muffler 800 by passing through input header 810, partition 814 and output header 812 is a through pipe 802. Pipe 802 includes a first plurality of perforations 806 enabling an input section of pipe 802 to have fluid communication with the muffler chamber 824 surrounding it. Pipe 802 has a second plurality of perforations 808 at an output end enabling fluid communication from the chamber 826 surrounding it to pipe 802.

Positioned between the first and second set of perforations of pipe 802 is a valve assembly 100 arranged as previously described in conjunction with FIGS. 1A-4B. Hence, in the closed position of valve assembly 100, exhaust will enter muffler 800 at the input end 828 of pipe 802 as seen in FIG. 8 and will flow through perforations 806 into the sound absorbing material 816 surrounding the pipe in chamber 824. The exhaust then flows from the first chamber 824 to the second chamber 826 via apertures 820, 822 in partition 814. Finally, the exhaust flows from the second chamber 826 through perforations 808 in through pipe 802 and out an exit end 830 of the pipe 802 as seen from FIG. 8.

When the exhaust pressure is high enough to overcome the force of bias spring 106, the valve flap 110 will open to a nearly horizontal position within pipe 802 to essentially have most of the exhaust gas bypass the first and second chambers and their associated sound absorbing material. Since the flap 110 will be substantially horizontal in FIG. 8 in the fully open position, back pressure in muffler 800 is minimized.

The invention has been described in conjunction with a detailed description of embodiments disclosed for the sake of example only. The scope and spirit of the invention are to be determined from an appropriate interpretation of the appended claims.

What is claimed is:

1. A muffler for an internal combustion engine exhaust system, the muffler comprising:
   a housing having an outer shell and input and output headers enclosing opposite ends of the shell;
   a partition inside the housing dividing a housing interior into first and second chambers, each having sound absorbing material positioned therein, the partition having at least one aperture therethrough providing for fluid communication between the first and second chambers;
   a through pipe extending through the input and output headers and the partition and having a first plurality of perforations enabling fluid communication between the through pipe and the first chamber, and a second plurality of perforations enabling fluid communication between the through pipe and the second chamber; and a valve assembly having a valve flap positioned inside the through pipe between the first and second pluralities of through pipe perforations for rotation about an axle pivotally coupled to the pipe between a fully closed position wherein a first peripheral portion of the valve flap is in contact with an inner surface of the through pipe and a fully open position wherein a plane of the valve flap is substantially parallel to a longitudinal axis of the through pipe and a second peripheral portion of the valve flap is in contact with an inner surface of the through pipe.

2. The muffler of claim 1 wherein the valve flap in the fully closed position intersects the longitudinal axis of the through pipe at an acute angle.

3. The muffler of claim 1 further comprising:

a bias element forcing the valve flap toward the fully closed position, the bias element mounted exteriorly of the through pipe between the through pipe and the axle.

4. The muffler of claim 3 wherein exhaust pressure in the through pipe forces the valve flap to the fully open position whenever the exhaust pressure is high enough to overcome bias element force.

* * * * *